(12) United States Patent
Andersen (10) Patent No.: US 7,046,996 B1
(45) Date of Patent: May 16, 2006

(54) MOBILE STATION, RADIO TELECOMMUNICATION SYSTEM AND METHODS FOR OPERATING RADIO TELECOMMUNICATIONS SYSTEMS

(75) Inventor: Niels Peter Skov Andersen, Roskilde (DK)

(73) Assignee: Motorola, Inc., Schaumburg, IL (US)

( * ) Notice: Subject to any disclaimer, the term of this patent is extended or adjusted under 35 U.S.C. 154(b) by 488 days.

(21) Appl. No.: 10/070,068

(22) PCT Filed: Oct. 16, 2000

(86) PCT No.: PCT/EP00/10199

§ 371 (c)(1),
(2), (4) Date: Mar. 4, 2002

(87) PCT Pub. No.: WO01/33879

PCT Pub. Date: May 10, 2001

(30) Foreign Application Priority Data

Oct. 29, 1999 (GB) .................................. 9925613.3

(51) Int. Cl.
*H04M 3/00* (2006.01)

(52) U.S. Cl. ...................... 455/418; 455/419; 455/503; 455/422.1; 455/434

(58) Field of Classification Search ............. 455/422.1, 455/432.1, 432.2, 435.1, 435.2, 436–444, 455/552.1
See application file for complete search history.

(56) References Cited

U.S. PATENT DOCUMENTS

| 5,301,232 | A | | 4/1994 | Mulford |
| 5,862,481 | A | * | 1/1999 | Kulkarni et al. .......... 455/432.2 |
| 5,933,784 | A | * | 8/1999 | Gallagher et al. ........ 455/552.1 |
| 6,094,578 | A | * | 7/2000 | Purcell et al. ........... 455/426.1 |
| 6,097,950 | A | * | 8/2000 | Bertacchi ................ 455/432.2 |
| 6,188,898 | B1 | * | 2/2001 | Phillips ..................... 455/433 |
| 6,408,173 | B1 | * | 6/2002 | Bertrand et al. ............ 455/406 |
| 6,697,620 | B1 | * | 2/2004 | Lamb et al. .............. 455/432.1 |

FOREIGN PATENT DOCUMENTS

WO    WO 99/43181    8/1999

\* cited by examiner

*Primary Examiner*—Temica Beamer
(74) *Attorney, Agent, or Firm*—Lalita W. Pace; Brian M. Mancini (57) ABSTRACT

The invention provides methods and apparatus, including mobile stations to enable the mobile station to encode and/or decode messages, for example messages broadcast by the base station on a broadcast channel. The encoding and decoding is based on a set of rules downloaded to the mobile station into an area of application space or storage dedicated to this function.

56 Claims, 3 Drawing Sheets

MOBILE STATION, RADIO TELECOMMUNICATION SYSTEM AND METHODS FOR OPERATING RADIO TELECOMMUNICATIONS SYSTEMS

TECHNICAL FIELD

The present invention relates to the field of telecommunication systems and is particularly, but not exclusively, applicable to the invention relates to mobile radio communication systems, such as those envisaged in the GSM (Global System for Mobile communications) or UMTS (Universal Mobile Telecommunications Standard).

BACKGROUND

Mobile or portable cellular telephones are typically arranged to communicate via a radio link to a base station of a network. Alternatively, a mobile telephone may communicate directly with a satellite.

Increasingly, cellular radio communications technology is being built into other devices. These include portable laptop 'or notebook' computers and 'personal digital assistants'. These devices can then also send data or voice over cellular communications networks.

In future, practically any device may be able to communicate over a cellular communications network.

An analogous form of technology to the cellular telephone consists of digital portable and mobile radios with private networks. These are commonly referred to as 'PMR' radios. Portable and mobile radios may be arranged either to communicate with one another via base stations, or directly with one another in 'direct mode'. The communication will typically either be over a digital simplex communication channel, or over a digital semi-duplex communication channel.

Mobile communications devices are commonly referred to as 'mobile stations'. In the following, the term mobile station will be used to describe any such electronic device capable of transmission and reception of voice and/or data including cellular transceivers (both terrestrial and satellite) and radio pagers.

The next generation of mobile stations will operate in accordance with a standard referred to as the universal mobile telephone standard (UMTS). The UMTS infrastructure will offer varying levels of service for UMTS mobile stations.

One goal of UMTS is the efficient use of the bandwidth associated with the lmited radio spectrum available to system operators. Another goal is the orderly function of a variety of different levels of service offered by the network. A further goal is supporting a wide variety of UMTS mobile stations with varying capabilities. For example, whilst a UMTS cell might offer the possibility for a mobile station to transmit video imagery, many mobile stations operating within that cell may not be capable of transmitting or receiving video imagery.

In cellular telecommunication systems, such as GSM and UMTS, the 25 broadcast capacity is limited for a number of different reasons. In the case of GSM, the original system design makes it difficult to extend the control channel overheads specified with the existing standard. The broadcast channels use spectrum for non-chargeable purposes. This may be seen as undesirable by an operator. The problem of broadcast capacity is a particular problem for multi-mode systems, in which there is a need to broadcast information about several modes, thus utilising significant amounts of the bandwidth allocation.

SUMMARY OF THE INVENTION

The above object is met by the combinations of features of the main claims, and the dependent claims disclose further advantageous embodiments of the invention.

According to a first aspect of the invention there is provided a mobile station for communicating with a radio telecommunications system, the mobile station comprising:
  means for communicating with the radio telecommunications system;
  means for storing rule information relating to predetermined coding rules;
  means for retrieving said rule information;
  means for decoding, using the retrieved rue information, signals received from the radio telecommunications system.

According to a second aspect of the invention there is provided a mobile station for communication over a telecommunications system, the mobile station comprising:
  means for communicating with the radio telecommunications system: means for storing and retrieving rule information relating to predetermined coding rules:
  means for encoding, using the retrieved rule information, signals to be transmitted to the radio telecommunications system According to a third aspect of the invention there is provided a first mobile station for communicating with second mobile station in a telecommunications system, the first mobile station comprising:
  means for storing rule information relating to predetermined coding rules;
  means for communicating with the second mobile station;
  means for retrieving said rule information:
  means for encoding or decoding, using the retrieved rule information, signals to be transmitted to or signals received from the second mobile station, which signals use the predetermined coding rules.

According to a fourth aspect of the invention there is provided a radio telecommunications system comprising:
  at least one base station;
  at least one mobile station;
  the at least one base station including means for transmitting signals to and means for receiving signals from the at least one mobile station;
  the at least one mobile station including means for receiving signals from and means for transmitting signals to the at least one base station;
  the mobile station including means for storing rule information relating to predetermined coding rules;
  the mobile station also including means for retrieving said rule information; and
  the mobile station further including means for decoding, using the retrieved rule information, signals transmitted by the base station using the predetermined coding rules.

According to a fifth aspect of the invention there is provided a radio telecommunications system comprising:
  at least one base station;
  at least one mobile station;
  the at least one base station including means for transmitting signals to and means for receiving signals from the at least one mobile station;

the at least one mobile station including means for receiving signals from and means for transmitting signals to the at least one base station;

the mobile station including means for storing rule information relating to predetermined coding rules;

the mobile station also including means for retrieving said rule information; and the mobile station further including means for encoding, using the retrieved rule information, signals to be transmitted to the base station using the predetermined coding rules.

According to a sixth aspect of the invention there is provided a radio telecommunications system comprising:

at least one base station; a plurality of mobile stations;

the at least one base station including means for transmitting signals to and means for receiving signals from each mobile station;

each mobile station including means for receiving signals from and means for transmitting signals to the at least one base station; each mobile station including means for storing rule information relating to predetermined coding rules;

each mobile station also including means for retrieving said rule information; and each mobile station further including means for encoding or decoding, using the retrieved rule information, signals to be transmitted to or signals received from a second mobile station within the radio telecommunications system which signals use the predetermined coding rules.

According to a seventh aspect of the invention there is provided a method of decoding signals sent by a radio telecommunications system, said system comprising at least one base station and at least one mobile station, comprising:

storing, in the mobile station, rule information relating to predetermined coding rules;

retrieving said rule information;

decoding, using the retrieved rule information, signals received from the radio telecommunications system.

According to a eighth aspect of the invention there is provided a method of encoding signals sent to a radio telecommunications system, said system comprising at least one base station and at least one mobile station, comprising:

storing, in the mobile station, rule information relating to predetermined coding rules;

retrieving said rule information:

encoding, using the retrieved rule information, signals to be transmitted to the radio telecommunications system.

According to a ninth aspect of the invention there is provided a method of encoding or decoding signals sent from a first mobile station to a second mobile station within a radio telecommunications system, comprising:

storing, in each mobile station, rule information relating to predetermined coding rules;

retrieving said rule information;

encoding or decoding, using the retrieved rule information, signals to be transmitted to or signals received from the second mobile station, which signals use the predetermined coding rules.

According to a tenth aspect of the invention there is provided a radio telecommunications system for broadcasting encoded broadcast information over a coverage area, comprising:

at least one mobile station;

the at least one base station including means for transmitting, over the coverage area, generic broadcast information in an unencoded format;

the at least one mobile station including means for receiving said generic broadcast information at the least one base station;

the mobile station including means for establishing a connection between the mobile station and the base station, using the generic broadcast information;

the base station including means for transmitting, over the connection to the mobile station, rule information relating to predetermined coding rules;

the mobile station also including means for storing rule information;

the mobile station further including means for retrieving said rule information;

the base station also including means for transmitting, over the coverage area, non-generic broadcast information encoded using the predetermined coding rules; and wherein said mobile station further includes means for decoding, using the retrieved rule information, the non-generic broadcast information transmitted by the base station.

According to a eleventh aspect of the invention there is provided a method of broadcasting encoded broadcast information over a coverage area in a radio telecommunications system, said system comprising at least one base station and at least one mobile station, comprising:

transmitting generic broadcast information in an unencoded format over the coverage area:

receiving said generic broadcast information at said mobile station;

said mobile station using the generic broadcast information to establish a connection between the mobile station and the base station transmitting, over the connection and from the base station to the mobile station, rule information relating to predetermined coding rules;

transmitting, from die base station, non-generic broadcast information encoded using the predetermined coding rules; and said mobile station using said rule information to decode said non-generic broadcast information.

According to a twelfth aspect of the invention there is provided a method of programming, by a radio telecommunications system a mobile station over a connection, said system comprising at least one base station, comprising:

establishing a connection between the mobile station and the at least one base station;

the base station transmitting, over the connection, rule information relating to predetermined coding rules:

programmig the mobile station with said rule information;

retrieving said rule information;

the mobile station encoding or decoding, using the retrieved rule information, signals to be transmitted to or received from the radio telecommunications system.

According to a thirteenth aspect of the invention there is provided a method of programming, by a radio telecommunications system a mobile station over a connection, said system comprising at least one base station and at least one other mobile station, comprising:

establishing a connection between the mobile station and the at least one base station;

the base station transmitting, over the connection, rule information relating to predetermined coding rules:

programming the mobile station with said rule information;

retrieving said rule information;

the mobile station encoding or decoding, using the retrieved rule information, signals to be transmitted to or received from the at least one other mobile station.

According to another aspect of the invention there is provided a radio telecommunications system comprising:

at least one base station;

at least one mobile station;

the at least one base station including means for transmitting signals to and means for receiving signals fro5m the at least one mobile station;

the at least one mobile station including means for receiving signals from and means for transmitting signals to the at least one base station;

the base station also including means for transmitting, to the mobile station, rule information relating to predetermined coding rules;

the mobile station also including means for storing and means for retrieving said rule information; and the mobile station further including means for decoding, using the retrieved rule information, signals transmitted by the base station using the predetermined coding rules.

According to yet another aspect of the invention there is provided a radio telecommunications system comprising:

at least one base station: at least one mobile station:

the at least one base station including means for transmitting signals to and means for receiving signals from the at least one mobile station:

the at least one mobile station including means for receiving signals from and means for transmitting signals to the at least one base station;

the base station also including means for transmitting, to the mobile station, rule information relating to predetermined coding rules;

the mobile station also including means for storing and means for retrieving said rule information; and the mobile station further including means for encoding, using the retrieved rule information, signals to be transmitted to the base station using the predetermined coding rules.

The invention provides methods and apparatus to enable the mobile station to encode and/or decode messages, for example messages broadcast by the base station on a broadcast channel. The encoding and decoding is based on a set of rules downloaded to die mobile station into an area of application space or storage dedicated to this function. In the following description, both the application space and rule information loaded into the application space are referred to as the "code-book.

The rules relating to the encoding and decoding information may be downloaded during registration with the radio telecommunications system or during another type of communication or connection with the radio telecommunications system. The rule information may be down-loaded to the storing means over broadcast channel, or another control channel or alternatively over a dedicated communications channel. The rule information may also be down-loaded to the storing means during a dedicated communication period separate from the communication requited to register the mobile station with the radio telecommunications system. Alternatively, the rules may be pre-loaded into the mobile station, for example when the mobile station is configured for operation on a radio telecommunications system by a particular operator.

The rule information may be updated as the mobile moves around the radio telecommunications system (or PLMN, public land-mobile network) and enters a new area of the radio telecommunications system, for example as the mobile moves between registration areas, or even cells within the network. The rule information may also be updated during the course of a dedicated communication between the mobile station and its serving base station, for example in order to facilitate the change from a GSM call to a WCOMA UMTS call) or vice versa, or as the functionality of the radio telecommunications system is dynamically updated, for example during peak or off-peak hours.

The rule information enables the mobile station to decode, amongst other signals, broadcast information from the radio telecommunications system; the broadcast information may be partly encoded in accordance with the predetermined decoding rules, and partly in unencoded format or coded using the standard schemes supported by existing communications prorocols. The radio telecommunications system may be a digital radio telecommunications system.

The summary of the invention does not necessarily disclose all the features essential for defining the invention; the invention may reside in a sub-combination of the disclosed features.

One advantage of the invention is that it provides a mechanism by which broadcast information may be compressed and thereby broadcast capacity can be increased.

Another advantage of the invention is that it allows the broadcast information to be tailored to the specific operation of a given radio telecommunications system and thereby minimises the overhead caused by broadcast messages needed to fulfill generic needs of the protocol employed by the system.

Yet another advantage of the inventions is that it alleviates the problems of prior art cellular communication systems, and to optimises UMTS systems for future deployment.

Yet another advantage of the invention is that it alleviates the problems of prior art cellular communication systems, and to optimises UMTS systems for future deployment.

BRIEF DESCRIPTION OF THE DRAWINGS

Embodiments of the invention are described below, by way of example only, and with reference to the following figures, in which.

DETAILED DESCRIPTION OF THE PREFERRED EMBODIMENTS

The following description is of preferred embodiments only without limitation to the combination of features necessary for putting the invention into effect.

Figure 1:
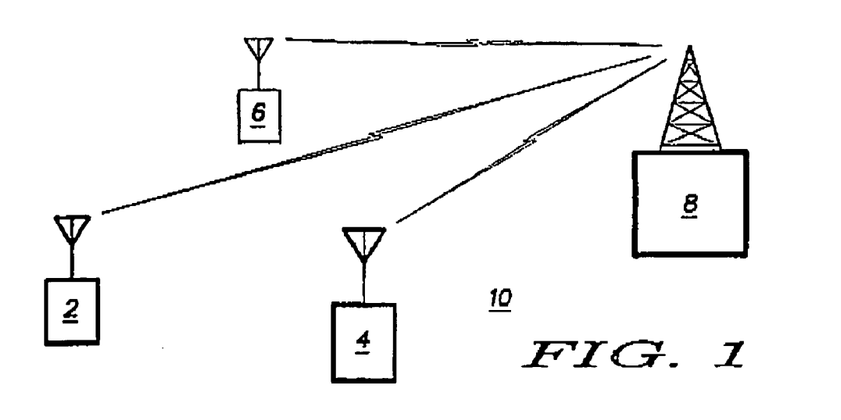
FIG. 1 illustrates the general scheme of a personal mobile radio system.

FIG. 1 illustrates the general scheme of a PLMN cellular mobile telecommunications system 10. Mobile stations 2, 4 and 6 of FIG. 1 can communicate with a base station 8.

Mobile stations 2, 4 and 6 could equally well be mounted in vehicles. Each of the mobile stations shown in FIG. 1 can communicate via base station 8 with one or more other mobile stations.

Alternatively, the mobile devices may communicate with other users not part of the PLMN, via other public telecommunications networks connected to the cellular telecommunications system. If mobile stations 2, 4 and 6 are capable of direct mode operation, then they may communicate directly with one another or with other mobile devices, without the communication link passing through base station 8.

Portable mobile radios and their base stations comprise analogous arrangements to those shown in FIG. 1.

As described above. FIG. 1 illustrates the general scheme of a cellular mobile telecommunication system 10, called hereafter the mobile telecommunications network or PLMN.

Immediately after being switched on or recovering coverage (i.e. upon entering an area of coverage from an area of no coverage), the mobile station searches for a mobile telecommunications network. The mobile station only needs to receive broadcast information containing the identity of the mobile telecommunications network and information regarding initial access to the mobile telecommunications network, for example in order to register on the network.

Imagine that mobile station 2 enters the scenario of FIG. 1, which in this embodiment represents a cellular mobile telecommunications system and searches for the mobile telecommunications network. Once broadcast information, transmitted by the base station 8, is received by the mobile station. The mobile station requests a connection to the base station, which when granted allows the mobile station to reaister with the mobile telecommunications network, e.g. using the GSM attach procedure or registration procedure. During the connection established for the registration procedure or any other initial access by the mobile station, the network transmits, via the down-link established between the base station and the mobile station, rule information in the form of a code-book to the mobile station. This code-book is stored in a separate area of the mobile station and is illustrated in more detail in FIG. 2.

Figure 2:
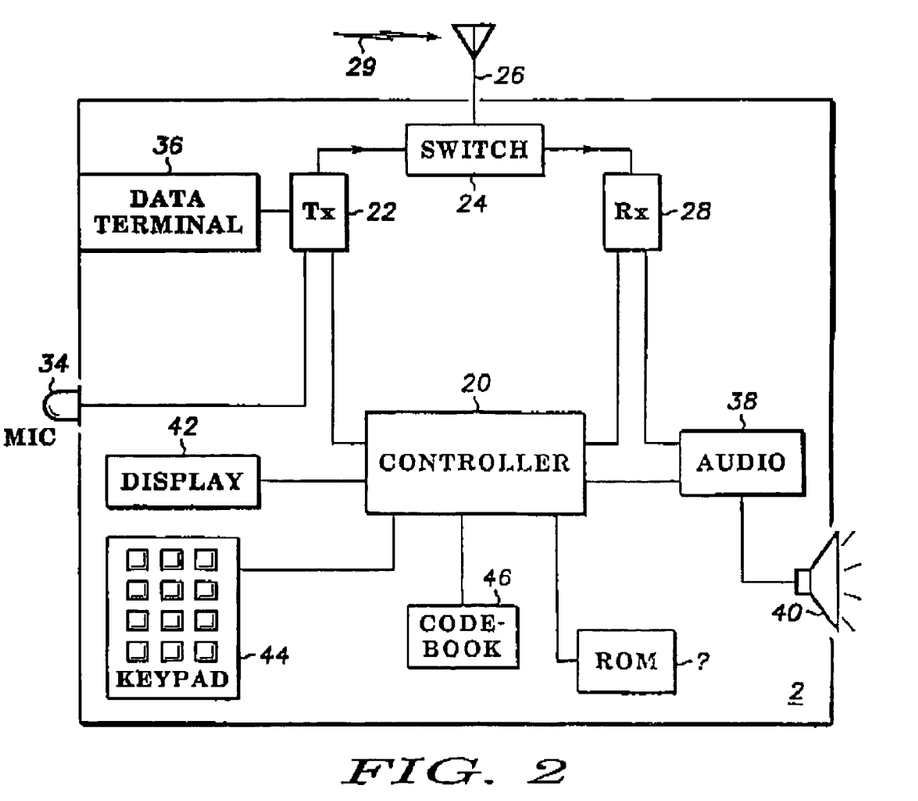
FIG. 2 illustrates in outline a mobile station according to the invention.

The mobile station comprises a transmitter 22 and a receiver 28 coupled via a switch 24 to antenna 26. The signals transmitted by the mobile station are generated by the mobile station controller (or processor) 20. Likewise, signals 29 received at the antenna 26 are also processed by the controller. The controller is also connected to a microphone 34, a data terminal 36, a speaker 40 via audio processor 38, display 42 and a keypad 44. Also connected to the controller is a ROM device 32 for storing fixed, essential information used by the controller in communicating with the network, such as the mobile station identification codes etc. Also connected to the controller is a code-book store 46, for example an area of RAM, flash RAM or NV RAM. The controller determines whether the information received from the network, via the base station, is rule information, representative of predetermined coding rules, which should be stored in the code book. Once stored in the code-book store, the rule information can be retrieved and used by the controller to decode the data, or information, contained in signals received at the mobile station antenna. Likewise, the rule information can be used by the controller to encode data to be transmitted in signals transmitted by the mobile station antenna.

The rule information may be updated, for example when the mobile station 25 moves between registration areas, or when the functionality of the network system changes.

Thus the rule information stored in the code book enables data in signals transmitted to and from the mobile station to be encoded according to predetermined coding rules. Since the rule information is sent to the mobile station during a connection with the network, the type of coding rules employed may thus be flexible and changed dynamically.

The code-book technique can be extended to be used to "compress" point-to point signalling as well, if the rule information supplied includes a set of encoding rules. Either a general code-book (containing both decoding rules and encoding rules) may be sent, for example at registration, or a dedicated code-book (containing encoding rules to be used for the connection) is sent in the early phase of an established connection.

The code-book of the invention is especially useful for allowing encoding o Associated control channels (ACCH). These channels may be transmitted in parallel with the user information transfer or are realised by frame stealing within the user information transfer. In both cases, the bandwidth is limited.

It will thus now be apparent to one skilled in the art that the code book may be employed in a number of different situations, some of which are described in more detail below.

In order to obtain initial access to a network, or PLMN, only a limited amount of information is needed. Typically, it is sufficient to check if access is allowable and the communication resource is likely to provide a usable signalling link. This limited information is referred in the following description as the "generic broadcast information".

In a first example, the rule information is transmitted by the network and stored in the code-book store may contain, amongst other things, the decoding rules for further broadcast information which is not a part of the generic broadcast information. This allows compression of the broadcast information to the minimum required for the operation of the given network. The code-book can be updated during any later access to the network; however to minimise the need for updating, the code-book may maintain constant or identical decoding rules across a registration area or a full PLMN. If die decoding rules are kept constant within a registration area, the use of the code-book will not generate the need for additional access to the network, as the mobile would normally have to access the network at change of registration area.

Once downloaded from the network, the mobile station utilises the received code-book to decode any further broadcast information. The broadcast information can, as described above, be considered to consist of two parts the "generic" broadcast information and the "non-generic" broadcast information. In addition this latter non-generic information can again be split into two parts, one part may be transmitted in such a manner as not to require the code-book to decode the information, although the information may never-the-less be encoded using encoding schemes or processes supported by the protocol running on the network. The other part of the information may require the code-book to decode or understand the information.

Figure 3:
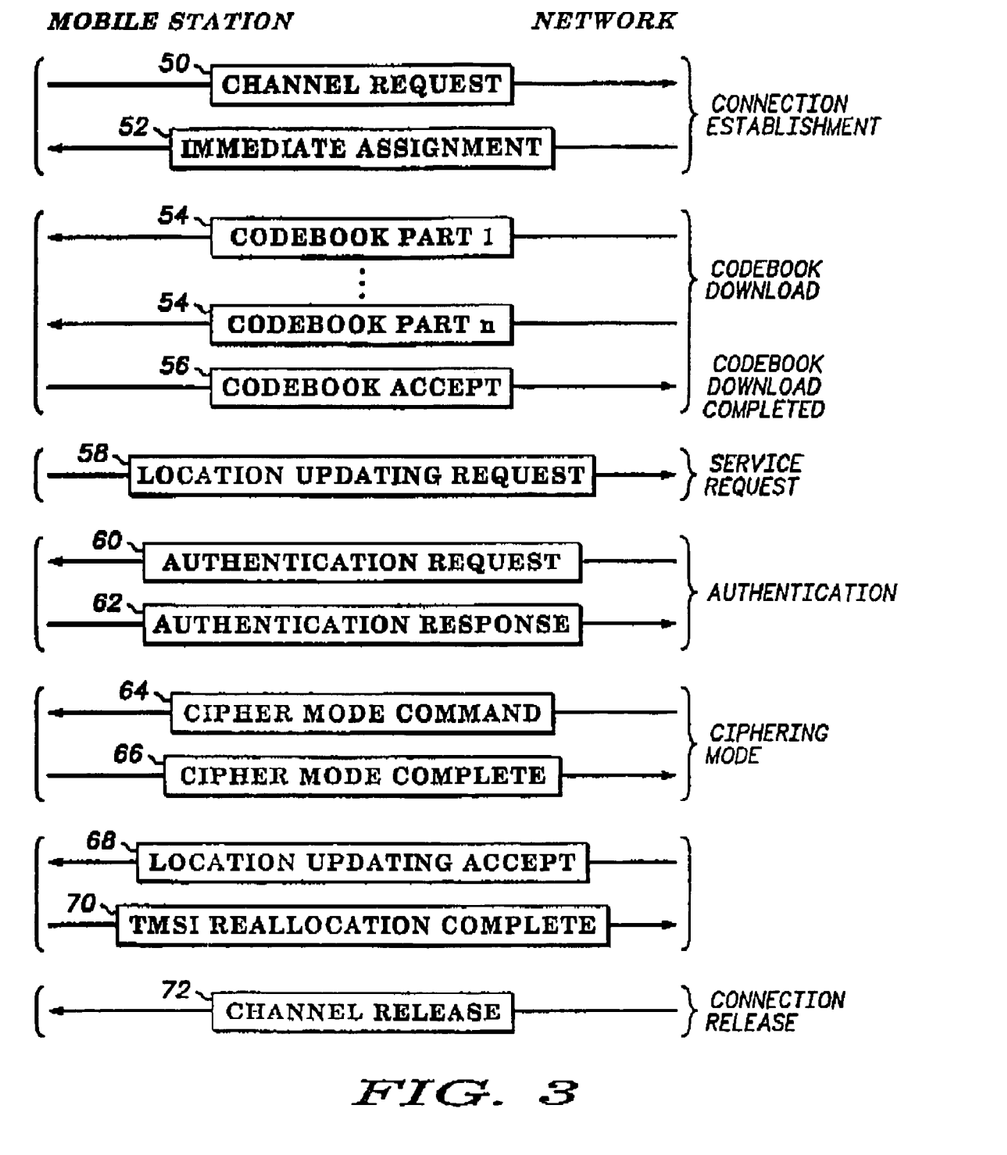
FIG. 3 illustrates an example of signals transmitted between a base station and a mobile station to download rule information according to one embodiment of the invention.

Registration and downloading of the rule information, or code-book, is illustrated in FIG. 3, using by way of example the GSM location update procedure. On receiving the BCCH signal the mobile requests a channel with request 50. The network, via the base station, responds by assigning a channel with channel assignment 52, and begins transmitting the code book rule information, in the code-book download 54. The mobile accepts the code book information with code-book accept 56 and the rest of the signals (60 to 72) are exchanged in the known manner. However, these signals may be encoded using the rule information, as described above, thereby enabling the messages exchanged (such as location updating 60 & 62, cipher mode 64 & 66, authentication 68 & 70 and TMSI allocation 72) to be compressed.

In a second example, a GSM network needs to broadcast information about neighboring cells in a UMTS network (or UMTS portion of the same PLMN). In a UMTS network the centre frequency of the W-CDMA carrier is placed on a 200 kHz raster and potentially uses variable duplex spacing. This will, if generic encoding rules are used, require that for each potential neighbour the broadcast information is capable of indicating any of approximately 300 potential carrier positions for up-link communication and a similar number for down-link communications. However, in practice an operator will only have very few carriers, e.g., an operator with an allocation of 2×20 MHz will only have 4–5 potential carrier up-link and down-link positions. If the code-book of the invention is used, then the code-book transmitted to the mobile station at, e.g. registration, can be used by the mobile to determine how octet N of message Y should be translated or decoded.

Figure 4:
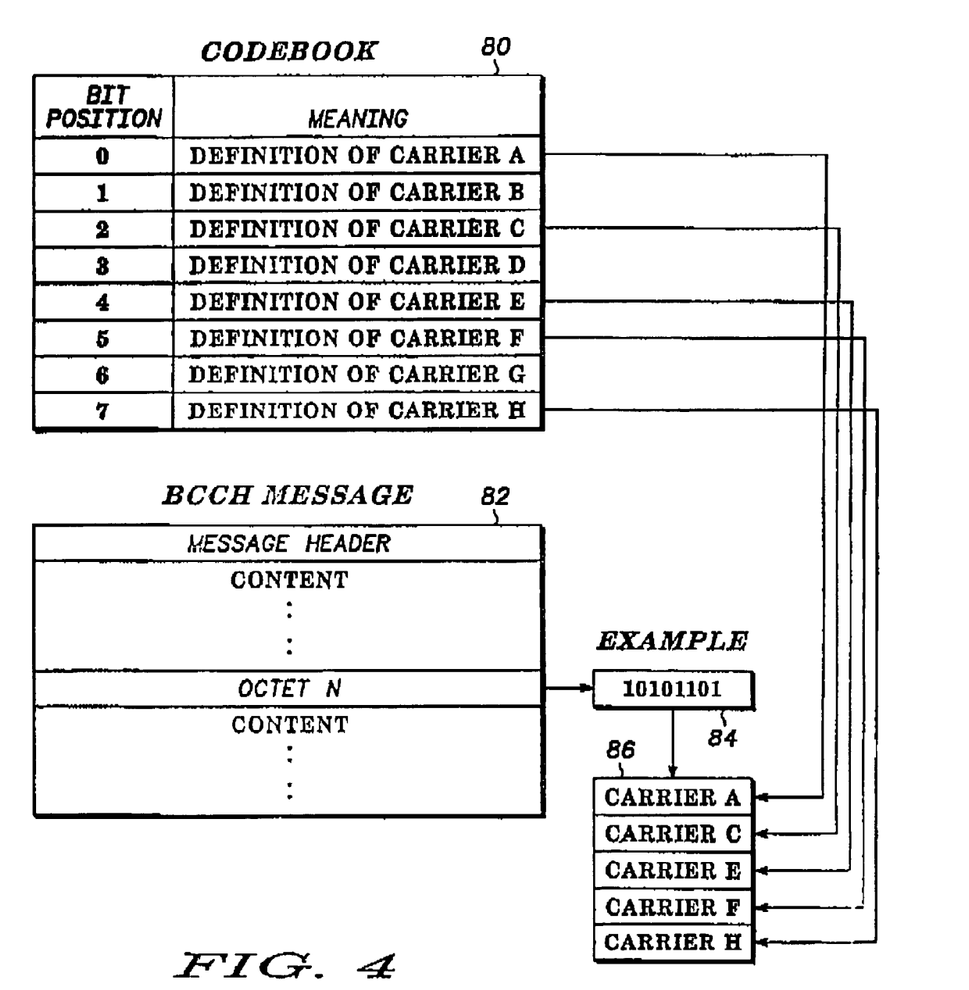
FIG. 4 illustrates graphically a simplified example of a code-book and BOCH message according to the invention.

One example of such neighbor list encoding is illustrated the representation of the code books and messages of FIG. 4. The rule information illustrated graphically by the look-up table 80 is transmitted by the GSM network to be stored in the code-book and defines, amongst other things, the definitions of a number of UMTS WODMA carriers (shown in FIG. 4 as carriers A to H). These definitions may include either the up-link frequency or the down-link frequency or duplex spacing. The definitions may also include the mode, such as frequency domain duplexing (FDD), time domain duplexing (TOD) etc., the relative timing and/or the code used (e.g. GMSK, codes rate).

Octet N of the message 82 illustrated represents a bit map, which in turn indicates the presence of carriers available as neighbors. The example octet, shown as 84, when decoded with the rule information from the code-book, indicates that carriers A,C,E,F and H are neighbor carriers.

The octet might also list the absolute frequency or absolute radio frequency number corresponding to each bit. In the above example any available UMTS neighbor frequency could be encoded in one octet on the broadcast channel, with full flexibility in the spectrum allocation. The bit mapping (that is, the look-up table for each bits which makes up the octet) to the correct absolute frequency is provided through the rule information stored in the code-book, which may, as described above, be provided to the mobile station on a dedicated channel at some other time during the interaction.

A similar technique can be applied to indicate which neighbor cells to measure, for example when the mobile station is in dedicated communication with the base station, such as when initiating or receiving a call. This may be used in, for example, mobile assisted handover.

The use of the invention in relation to dedicated connections can be split into two main categories. In these examples of the invention, the code-book is downloaded to the mobile station prior to the establishment of the dedicated connection, e.g., at registration. The code-book specifies the encoding and decoding of messages or part of messages exchanged between the network and the mobile station during the dedicated connections.

A first dedicated connections example of the invention may be applied to a network (PLMN) consisting of both a GSM radio access portion and a UMTS radio access portion. The code-book is downloaded to the mobile station, and specifies, in particular, that when messages contains some explicit GSM ARFONs (Absolute Radio Frequency numbers), these should be interpreted as given UMTS carriers (defined by mode (TDD/FFD), centre-frequency, duplex-spacing (for FDD) and possibly also bandwidth and chiprate). This use of the code-book thus allows reuse of GSM signaling, e.g., to command mobile stations in connected mode to monitor UMTS carriers for neighbor measurement reporting. In addition, the code-book can be used to compress the signaling channels and thereby decrease the overhead required for signaling. This process may be adapted and applied to the broadcast examples discussed previously.

In a second dedicated connections example of the invention, the code-book is downloaded and/or updated during an established dedicated connection. This can be implemented in conjunction with the first dedicated communication example described above, to update the code-book stored in the mobile station, e.g. in cases where the network is being reconfigured, or independently. Alternatively, this second dedicated communication example may be used for time critical messages such as, e.g., assignment and handover messages, where too large a message size would cause segmentation and thereby introduce a transmission delay. Such messages will typically be defined to cope with all types of configuration and modes of operation. By using a code-book, specified and downloaded to the mobile station, the time critical messages may be kept small because bits are only assigned to signal information relevant for the actual configuration and mode of operation in the given cell, registration area, or PLMN. Additionally, and as above, the code-book can be used for compression of the signaling channels and thereby decrease the overhead required for signaling.

The code-book may also be used to specify error correcting codes used, e.g., on the physical layer or upper layers. For example, a code-book which specifies types of error correcting codes (Convolutional. Reed-Solomon, Turbo-code etc., the rate (e.g., 172, /13, 2/3 etc), the generator polynominals, and tailbit), may be downloaded to the mobile. This example provides the means for flexible allocation of protection level and may also be used to define broadcast channels.

The invention claimed is:

1. A mobile station for communicating with a radio telecommunications system, the mobile station comprising:
   means for communicating with the radio telecommunications system;
   means for receiving rule information relating to predetermined coding rules from the radio telecommunication system over an air interface;
   means for storing said rule information;
   means for retrieving said rule information;
      means for decoding, using the retrieved rule information, signals received from the radio telecommunications system, wherein the rule information enables the mobile station to decode broadcast information from the telecommunications system, the broadcast information being partly encoded in accordance with the predetermined coding rules, and partly in unencoded format.

2. A mobile station for communication over a telecommunications system, the mobile station comprising:
   means for communicating with the radio telecommunications system;
   means for receiving rule information relating to predetermined coding rules from the telecommunication system over an air interface;

means for storing and retrieving said rule information;
means for encoding, using the retrieved rule information, signals to be transmitted to the radio telecommunications system, wherein the rule information enables the mobile station to encode information for the telecommunications system, the information being partly encoded in accordance with the predetermined coding rules, and partly in unencoded format.

3. A first mobile station for communicating with second mobile station in a telecommunications system, the first mobile station comprising:
means for receiving rule information relating to predetermined coding rules from the telecommunication system over an air interface;
means for storing said rule information;
means for communicating with the second mobile station;
means for retrieving said rule information;
means for encoding or decoding, using the retrieved rule information, signals to be transmitted to or signals received from the second mobile station, which signals use the predetermined coding rules, wherein the predetermined coding rules enables the mobile station to encode or decode information for the other mobile station, the information being partly encoded in accordance with the predetermined coding rules, and partly in unencoded format.

4. A mobile station in accordance with claim 1, 2 or 3, wherein the rule information is down-loaded to the storing means during registration of the mobile station with the telecommunications system.

5. A mobile station in accordance with claim 1, 2 or 3, wherein the rule information is down-loaded to the storing means over a dedicated communications channel.

6. A mobile station in accordance with claim 1, 2 or 3, wherein the rule information is down-loaded to the storing means during a dedicated communication period separate from the communication required to register the mobile station with the telecommunications system.

7. A mobile station in accordance with claim 1, 2 or 3, wherein the rule information is down-loaded to the storing means as pre-loaded information, prior to registration of the mobile station with the telecommunications system.

8. A mobile station in accordance with claim 1, wherein the rule information is up-dated each time that the mobile station enters a new area of the radio telecommunications system.

9. A mobile station in accordance with claim 1, wherein the rule information is up-dated each time that the mobile station enters a new registration area of the radio telecommunications system.

10. A mobile station in accordance with claim 1, wherein the rule information is up-dated each time that the mobile station enters a new cell of the radio telecommunications system.

11. A mobile station in accordance with claim 1, wherein the rule information enables the mobile station to decode broadcast information from the telecommunications system.

12. A mobile station in accordance with claim 1, where the radio telecommunications system is a digital radio telecommunications system.

13. A radio telecommunications system comprising;
at least one base station;
at least one mobile station;
the at least one base station including means for transmitting signals to and means for receiving signals from the at least one mobile station;
the at least one mobile station including means for receiving signals from and means for transmitting signals to the at least one base station;
the mobile station comprising means for receiving rule information relating to predetermined coding rules from the radio telecommunication system over an air interface;
the mobile station also including means for storing said rule information;
the mobile station also including means for retrieving said rule information; and
the mobile station further including means for decoding, using the retrieved rule information, signals transmitted by the base station using the predetermined coding rules, wherein the rule information enables mobile station to decode the signals from the telecommunications system, the signals being partly encoded in accordance with the predetermined coding rules, and partly in unencoded format.

14. A radio telecommunications system comprising:
at least one base station;
at least one mobile station;
the at least one base station including means for transmitting signals to and means for receiving signals from the at least one mobile station;
the at least one mobile station including means for receiving signals from and means for transmitting signals to the at toast one base station;
the mobile station comprising means for receiving rule information relating to predetermined coding rules from the radio telecommunication system over an air interface;
the mobile station also including means for storing said rule information;
the mobile station also including means for retrieving said rule information; and
the mobile station further including means for encoding, using the retrieved rule information, signals to be transmitted to the base station using the predetermined coding rules, wherein the rule information enables the mobile station to encode the signals for the telecommunications system, the signals being partly encoded in accordance with the predetermined coding rules, and partly in unencoded format.

15. A radio telecommunications system comprising:
at least one base station;
a plurality of mobile stations;
the at least one base station including means for transmitting signals to and means for receiving signals from each mobile station;
each mobile station including means for receiving signals from and means for transmitting signals to the at least one base station;
each mobile station comprising means for receiving rule information relating to predetermined coding rules from the radio telecommunication system over an air interface;
each mobile station also including means for storing said rule information;
each mobile station also including means for retrieving said rule information; and
each mobile station further including means for encoding or decoding, using the retrieved rule information, signals to be transmitted to or signals received from a second mobile station within the radio telecommunications system which signals use the predetermined coding rules, wherein the rule information enables the mobile station to encode or decode the signals for the other mobile station, the signals being partly encoded or decoded in accordance with the predetermined coding rules, and partly in unencoded format.

16. A radio telecommunications system in accordance with claim 13, 14 or 15, wherein the rule information is down-loaded to the storing means of the mobile station during registration of the mobile station with the telecommunications system.

17. A radio telecommunications system in accordance with claim 13, 14 or 15, wherein the rule information is down-loaded to the storing of the mobile station means over a dedicated communications channel.

18. A radio telecommunications system in accordance with claim 13, 14 or 15, wherein the rule information is down-loaded to the storing of the mobile station means during a dedicated communication period separate from the communication required to register the mobile station with the telecommunications system.

19. A radio telecommunications system in accordance with claim 13, 14 or 15, wherein the rule information is downloaded to the storing of the mobile station means as pre-loaded information, prior to registration of the mobile station with the telecommunications system.

20. A radio telecommunications system in accordance with claim 13, wherein the rule information is up-dated each time that the mobile station enters a now area of the radio telecommunications system.

21. A radio telecommunications system in accordance with claim 13, wherein the rule information is up-dated each time that the mobile station enters a new registration area of the radio telecommunications system.

22. A radio telecommunications system in accordance with claim 13, wherein the rule information is up-dated each time that the mobile station enters a new cell of the radio telecommunications system.

23. A radio telecommunications system in accordance with claim 13, wherein the rule information enables the mobile station to decode broadcast information from the telecommunications system.

24. A radio telecommunications system in accordance with claim 13, where the radio telecommunications system is a digital radio telecommunications system.

25. A method of decoding signals sent by a radio telecommunications system said system comprising at least one base station and at least one mobile station, comprising:
  receiving, by the mobile station, rule information relating to predetermined coding rules from the radio telecommunication system over an air interface;
  storing, in the mobile station, said rule information;
  retrieving said rule information;
  decoding, using the retrieved rule information, signals received from the radio telecommunications system, the signals being partly encoded in accordance with the predetermined coding rules, and partly in unencoded format.

26. A method of encoding signals sent to a radio telecommunications system, said system comprising at least one base station and at least one mobile station, comprising:
  receiving, by the mobile station, rule information relating to predetermined coding rules from the radio telecommunication system over an air interface;
  storing, in the mobile station, said rule information;
  retrieving said rule information;
  encoding, using the retrieved rule information, signals to be transmitted to the radio telecommunications system, the signals being partly encoded in accordance with the predetermined coding rules, and partly in unencoded format.

27. A method of encoding or decoding signals sent from a first mobile station to a second mobile station within a radio telecommunications system, comprising:
  receiving, by each mobile station, rule information relating to predetermined coding rules from the radio telecommunication system over an air interface;
  storing, in each mobile station, said rule information;
  retrieving said rule information;
  encoding or decoding, using the retrieved rule information, signals to be transmitted to or signals received from the second mobile station, which signals use the predetermined coding rules, the signals being partly encoded in accordance with the predetermined coding rules, and partly in unencoded format.

28. A method in accordance with claim 25, 26 or 27, comprising down-loading the rule information to the storing means during registration of the mobile station with the telecommunications system.

29. A method in accordance with claim 25, 26 or 27, comprising down-loading the rule information to the storing means over a dedicated communications channel.

30. A method in accordance with claim 25, 26 or 27, comprising down-loading the rule information to the storing means during a dedicated communication period separate from the communication required to register the mobile station with the telecommunications system.

31. A method in accordance with claim 25, 26 or 27, comprising down-loading the rule information to the storing means as pre-loaded information, prior to registration of the mobile station with the telecommunications system.

32. A method in accordance with claim 25, comprising up-dating the rule information each time that the mobile station enters a new area of the radio telecommunications system.

33. A method in accordance with claim 25, comprising up-dating the rule information each time that the mobile station enters a new registration area of the radio telecommunications system.

34. A method in accordance with claim 25, comprising up-dating the rule information each time that the mobile station enters a new cell of the radio telecommunications system.

35. A method in accordance with claim 25, comprising enabling the mobile station to decode, using the rule information, broadcast information from the telecommunications system.

36. A method in accordance with claim 26, where the radio telecommunications system is a digital radio telecommunications system.

37. A radio telecommunications system for broadcasting encoded broadcast information over a coverage area, comprising:
  at least one mobile station;
  the at least one base station including means for transmitting, over the coverage area, generic broadcast information in an unencoded format;
  the at least one mobile station including means for receiving said generic broadcast information at the least one base station;
  the mobile station including means for establishing a connection between the mobile station and the base station, using the generic broadcast information;

the base station including means for transmitting, over the connection to the mobile station, rule information relating to predetermined coding rules;

the mobile station also including means for receiving said rule information from the base station over an air interface;

the mobile station also including means for storing rule information;

the mobile station further including means for retrieving said rule information;

the base station also including means for transmitting, over the coverage area, non-generic broadcast information encoded using the predetermined coding rules; and wherein said mobile station further includes means for decoding, using the retrieved rule information, the non-generic broadcast information transmitted by the base station, the non-generic broadcast information is partly encoded in accordance with the predetermined coding rules, and partly in unencoded format.

38. A radio telecommunications system in accordance with claim 37, where, in the alternative to the base station including means for transmitting, over the connection to the mobile station, rule information relating to predetermined coding rules, the rule information is down-loaded to the storing means of the mobile station means as pre-loaded information.

39. A radio telecommunications system in accordance with claim 37, wherein the rule information is up-dated each time that the mobile station enters a new area of the radio telecommunications system.

40. A radio telecommunications system in accordance with claims 37, wherein the rule information is up-dated each time that the mobile station enters a new registration area of the radio telecommunications system.

41. A radio telecommunications system in accordance with claims 37, wherein the rule information is up-dated each time that the mobile station enters a new cell of the radio telecommunications system.

42. A radio telecommunications system in accordance with claim 37, where the radio telecommunications system is a digital radio telecommunications system.

43. A method of broadcasting encoded broadcast information over a coverage area in a radio telecommunications system, said system comprising at least one base station and at least one mobile station, comprising:

transmitting generic broadcast information in an unencoded format over the coverage area;

receiving said generic broadcast information at said mobile station;

said mobile station using the generic broadcast information to establish a connection between the mobile station and the base station;

transmitting, over the connection and from the base station to the mobile station, rule information relating to predetermined coding rules;

transmitting, from the bass station, non-generic broadcast information encoded using the predetermined coding rules; and the mobile station receiving said rule information from the base station over an air interface;

said mobile station using said rule information to decode said non-generic broadcast information, the non-generic broadcast information is partly encoded in accordance with the predetermined coding rules, and partly in unencoded format.

44. A method in accordance with claim 43, comprising, in the alternative to the base station transmitting, over the connection to the mobile station, rule information relating to predetermined coding rules, the rule information is down-loaded to the storing means of the mobile station means as pre-loaded information.

45. A method in accordance with claim 43, comprising updating the rule information each time that the mobile station enters a new area of the radio telecommunications system.

46. A method in accordance with claims 43, comprising updating the rule information each time that the mobile station enters a new registration area of the radio telecommunications system.

47. A method in accordance with claims 43, comprising updating the rule information each time that the mobile station enters a new cell of the radio telecommunications system.

48. A method in accordance with claims 43, comprising transmitting the non-generic broadcast information in partly encoded in accordance with the predetermined decoding rules, and partly in unencoded format.

49. A method in accordance with claim 43, where the radio telecommunications system is a digital radio telecommunications system.

50. A method of programming, by a radio telecommunications system a mobile station over a connection, said system comprising at least one base station, comprising:

establishing a connection between the mobile station and the at least one base station;

the base station transmitting, over the connection, rule information relating to predetermined coding rules;

the mobile station receiving said rule information from the base station over an air interface;

programming the mobile station with said rule information; retrieving said rule information;

the mobile station encoding or decoding, using the retrieved rule information, signals to be transmitted to or received from the radio telecommunications system, the signals being partly encoded in accordance with the predetermined coding rules, and partly in unencoded format.

51. A method of programming, by a radio telecommunications system, a mobile station over a connection, said system comprising at least one base station and at least one other mobile station, comprising:

establishing a connection between the mobile station and the at least one base station:

the base station transmitting, over the connection, rule information relating to predetermined coding rules;

the mobile station receiving said rule Information from the base station over an air interface;

programming the mobile station with said rule information; retrieving said rule information;

the mobile station encoding or decoding, using the retrieved rule information, signals to be transmitted to or received from the at least one other mobile station, the signals being partly encoded in accordance with the predetermined coding rules, and partly in unencoded format.

52. A method in accordance with claims 50 or 51, comprising updating the rule information each time that the mobile station enters a new area of the radio telecommunications system.

53. A method in accordance with claims 50 or 51, comprising updating the rule information each time that the mobile station enters a new registration area of the radio telecommunications system.

54. A method in accordance with claims 50 or 51, comprising updating the rule information each time that the mobile station enters a new cell of the radio telecommunications system.

55. A method in accordance with claims 50 or 51, comprising enabling the mobile station to decode, using the rule information, broadcast information from the telecommunications system.

56. A method in accordance with claims 50 or 51, where the radio telecommunications system is a digital radio telecommunications system.

* * * * *